(12) United States Patent
Goto et al.

(10) Patent No.: US 7,957,867 B2
(45) Date of Patent: Jun. 7, 2011

(54) STEERING SYSTEM OF VEHICLE

(75) Inventors: Takeshi Goto, Toyota (JP); Ryuuichi Kurosawa, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1136 days.

(21) Appl. No.: 11/661,496

(22) PCT Filed: May 29, 2006

(86) PCT No.: PCT/JP2006/011148
§ 371 (c)(1),
(2), (4) Date: Feb. 27, 2007

(87) PCT Pub. No.: WO2006/134789
PCT Pub. Date: Dec. 21, 2006

(65) Prior Publication Data
US 2007/0265750 A1  Nov. 15, 2007

(30) Foreign Application Priority Data
Jun. 14, 2005 (JP) .................. 2005-174013

(51) Int. Cl.
*B62D 5/04* (2006.01)
*B62D 6/00* (2006.01)
(52) U.S. Cl. ............... 701/41; 701/42; 701/43; 701/83; 180/443
(58) Field of Classification Search .............. 701/41, 701/42, 83, 70, 78, 89, 48, 72, 90; 108/443, 108/412, 413; 303/191; 180/443, 412, 415
See application file for complete search history.

(56) References Cited

U.S. PATENT DOCUMENTS

| | | | |
|---|---|---|---|
| 4,524,842 A | 6/1985 | Kanazawa | |
| 2002/0161505 A1 | 10/2002 | Reich et al. | |
| 2005/0080532 A1* | 4/2005 | Kato et al. | ...................... 701/41 |

FOREIGN PATENT DOCUMENTS

| | | |
|---|---|---|
| DE | 103 50 920 A1 | 5/2005 |
| EP | 0 943 515 A1 | 9/1999 |
| EP | 1 514 765 A2 | 3/2005 |
| EP | 1 609 696 A2 | 12/2005 |
| JP | 2 95982 | 4/1990 |
| JP | 5-185946 | 7/1993 |
| JP | 2000 264 238 | 9/2000 |
| JP | 2000 264237 | 9/2000 |
| JP | 2003 252229 | 9/2003 |
| JP | 2004-345406 | 12/2004 |
| KR | 1998-079488 | 11/1998 |

* cited by examiner

*Primary Examiner* — Ronnie Mancho
(74) *Attorney, Agent, or Firm* — Oblon, Spivak, McClelland, Maier & Neustadt, L.L.P.

(57) ABSTRACT

An electronic control unit reads a side slip angle of a vehicle body. Next, the electronic control unit reads a correction amount entered by a driver. Next, the electronic control unit calculates a target steering angle by subtracting a correction term from a rotation amount of a steering output shaft, which has a predetermined relation with a rotation amount of a steering input shaft, to reduce a lateral force generated in the vehicle due to the side slip angle of the vehicle body. Subsequently, the electronic control unit drives and controls an electric motor of a variable-gear-ratio actuator until the rotation amount of the steering output shaft reaches the target steering angle.

12 Claims, 3 Drawing Sheets

STEERING SYSTEM OF VEHICLE

TECHNICAL FIELD

The present invention relates to a steering apparatus for a vehicle which includes a steering input shaft integrally connected to a steering wheel rotated by a driver, a steering output shaft connected to a steering mechanism for steering steerable wheels, and an electric actuator for changing the amount of rotation of the steering output shaft with respect to the amount of rotation of the steering input shaft.

BACKGROUND ART

Conventionally, there have been actively developed steering apparatuses for vehicles which can improve both the kinematic performance and behavior stability of a vehicle in a turning state. In a steering apparatus for a vehicle which employs a steering control method for a four-wheel steering vehicle as shown in, for example, Japanese Patent Application Laid-Open (kokai) No. H2-95982, steering forces, lateral forces, or side slip angles of front and rear wheels are detected; and under the assumption that the steering forces or lateral forces of the front and rear wheels are in proportion to the side slip angles, the front-wheel steering angle is controlled in accordance with a value obtained by adding to the front-wheel steering angle a correction steering angle proportional to the front-wheel side slip angle, and the rear-wheel steering angle is controlled in proportion to the rear-wheel side slip angle. With this configuration, the proportionality coefficients to the front-wheel side slip angle and the rear-wheel side slip angle; i.e., front-wheel and rear-wheel steering coefficients, can be variably controlled individually. Therefore, generation of a phase delay in generation of yawing moment in relation to steering can be prevented, and steering characteristics can be freely controlled through changing the balance between cornering powers of the front and rear wheels.

DISCLOSURE OF THE INVENTION

Incidentally, a lateral force which a vehicle requires to turn is imparted by means of friction forces between a road surface and tires attached to front and rear wheels. The lateral force required for turning will be considered in detail. Such a lateral force is the sum of a steering-attributable lateral force generated as a result of the front and rear wheels being steered in the case of a four-wheel steering vehicle (the front wheels being steered in the case of a front-wheel steering vehicle) and a side-slip-angle-attributable lateral force generated because the front and rear wheels (more specifically, their tires) have side slip angles. Since the front and rear wheels are mounted to the vehicle body, when the front and rear wheels have side slip angles and the vehicle is in a turning state, the vehicle body also has a side slip angle. Accordingly, the lateral force which the vehicle requires to turn can be considered to be the sum of a steering-angle-attributable lateral force and a side-slip-angle-attributable lateral force generated because the vehicle body has a side slip angle. The higher the vehicle speed, the greater the side slip angle generated; and the greater the side slip angles of the tires of the front and rear wheels, the greater the side-slip-angle-attributable lateral force generated.

In the steering apparatus for a vehicle which employs the above-described conventional steering control method, when a driver steers the steering wheel, the front and rear wheels are steered, whereby the side slip angles of the tires of the front and rear wheels increase. As a result, the lateral force acting on the vehicle becomes greater than the steering-angle-attributable lateral force, because a lateral force corresponding to the increased side slip angles of the front and rear wheels is added to the steering-angle-attributable lateral force, so that the vehicle can turn more easily. In other words, when the driver steers the steering wheel to thereby steer the front and rear wheels, a lateral force corresponding to a side slip angle of the vehicle body generated as a result of the steering operation is additionally generated, whereby the vehicle turns as in the case where the front and rear wheels are additionally steered. In such a case, when the vehicle travels at high speed, the conventional steering method steers the front and rear wheels in the same phase so as to reduce the side slip angle of the vehicle body, to thereby suppress generation of the side-slip-angle-attributable lateral force. Although the side slip angle of the vehicle body decreases, the rear wheels are still steered, and large side slip angles are generated at the front and rear wheels with resultant generation of a lateral force, so that a large lateral force which the driver does not expect acts on the vehicle.

With regard this, the above-described conventional steering control method can prohibit steering of the rear wheels, and correct the steering angle of the front wheels through addition of a correction steering angle proportional to the side slip angle generated at the front wheels. However, this correction merely reduces the lateral force corresponding to the side slip angles of the front wheels, and does not reduce the lateral force corresponding to the side slip angles which are generated at the steering-prohibited rear wheels during turning. As a result, a side slip angle generated in the turning vehicle cannot be corrected, so that a lateral force which corresponds to the side slip angle of the vehicle body and which the driver does not expect still acts on the vehicle.

As described above, in a state in which a lateral force corresponding to a side slip angle of the vehicle body, which the driver does not expect, is added to a lateral force corresponding to the steering angle generated in accordance with steering of the steering wheel by the driver, a lateral force greater than that generated through steering of the steering wheel acts on the vehicle, and the steerable wheels are excessively steered. As a result, the vehicle may have a so-called over-steer characteristic in which the vehicle turns with a turning radius smaller than the turning radius that the driver expects. Therefore, when the vehicle travels, for example, at high speed, or on snow or ice, even for a driver who is very knowledgeable, it is difficult to stabilize the behavior of the vehicle during turning.

The present invention has been accomplished to solve the above-described problem, and an object of the present invention is to provide a steering apparatus for a vehicle which positively reduces the influence of lateral force corresponding to a side slip angle of the vehicle body and acting on the vehicle during turning, to thereby stabilize the behavior of the vehicle during turning.

In order to achieve the above-described object, the present invention provides a steering apparatus for a vehicle which includes a steering input shaft integrally connected to a steering wheel rotated by a driver, a steering output shaft connected to a steering mechanism for steering steerable wheels, and an electric actuator for changing the amount of rotation of the steering output shaft with respect to the amount of rotation of the steering input shaft, the steering apparatus comprising side-slip-angle detection means for detecting a side slip angle of a vehicle body generated when the vehicle is in a turning state; target-rotation-amount calculation means for calculating a target rotation amount of the steering output shaft in consideration of a correction term determined in accordance with the side slip angle of the vehicle body detected by the side-slip-angle detection means so as to reduce an influence, on the turning state of the vehicle, of a lateral force generated in the vehicle due to the side slip angle of the vehicle body; and drive control means for controlling drive of the electric actuator on the basis of the target rotation amount calculated by the target-rotation-amount calculation means. In this case, preferably, the target-rotation-amount calculation means calculates the target rotation amount by subtracting the correction term from the rotation amount of the steering output shaft, which has a predetermined relation with the rotation amount of the steering input shaft.

In these cases, preferably, the correction term is calculated by multiplying together the detected side slip angle of the vehicle body and a coefficient calculated by use of a cornering force toward a turning center of the vehicle on the basis of a friction force between a road surface and front and rear wheels of the vehicle in a turning state. Further, preferably, the steering apparatus comprises adjustment value input means which is operated by a driver so as to enter an adjustment value representing a degree to which the influence of the lateral force on the turning state of the vehicle is reduced, wherein the correction term is calculated by multiplying together the adjustment value entered by use of the adjustment value input means and the detected side slip angle of the vehicle body.

By virtue of the above-described configurations, in the steering apparatus which can relatively change the rotation amount of rotation of the steering output shaft to the rotation amount of the steering input shaft, such as a steering apparatus including a variable gear mechanism or a steering-by-wire-type steering apparatus, the target-rotation-amount calculation means can calculate a target rotation angle of the steering output shaft in consideration of the correction term determined in accordance with the side slip angle of the vehicle body detected by the side-slip-angle detection means. More specifically, the target rotation amount can be calculated by subtracting the correction term from the rotation amount of the steering output shaft rotated on the basis of the predetermined relation between the rotation amount of the steering input shaft and the rotation amount of the steering output shaft (for example, a transmission ratio at which rotation of the steering input shaft is transmitted to the steering output shaft). The drive control means can rotate the steering output shaft by the calculated rotation amount by driving and controlling the electric actuator, whereby the steerable wheels are steered to a steering angle corresponding to the target rotation amount transmitted via a steering mechanism.

As described above, the target rotation amount of the steering output shaft is calculated in consideration of the correction term determined in accordance with the side slip angle of the vehicle body, whereby the influence of a lateral force which the driver does not expect and which acts on the vehicle in a turning state can be reduced. As a result, when the driver rotates the steering wheel, in appearance, only a lateral force based on the rotation (i.e., a lateral force corresponding to the steering angle) acts on the vehicle. Thus, the vehicle can be turned in accordance with the operation of the steering wheel by the driver. In other words, the vehicle can be turned by an amount corresponding to the rotation of the steering wheel. Accordingly, even when a driver who is not very knowledgeable drives the vehicle at high speed, or on snow or ice, the behavior of the vehicle during turning can be stabilized, and the driver can drive the vehicle in accordance with his/her intention.

Since the correction term used for calculating the target rotation amount can be calculated by multiplying together the side slip angle of the vehicle body and the coefficient calculated by use of the cornering forces of the front and rear wheels. This enables the correction term to be optimally determined in accordance with the turning state of the vehicle, whereby the vehicle can be quite easily caused to turn in a stable state. Further, the correction term may be calculated by multiplying together the side slip angle of the vehicle body and an adjustment value which is entered by a driver and represents a degree of reduction of a lateral force which influences the turning state of the vehicle due to the side slip angle of the vehicle body. This enables the degree of correction to be determined in accordance with the driver's preference. Accordingly, the behavior of the vehicle during turning can be stabilized, and driving of the vehicle in accordance with his/her intention is enabled, while good steering feeling is secured.

Moreover, the steering apparatus may comprise vehicle speed detection means for detecting a vehicle speed of the vehicle; and prohibition means for prohibiting calculation of the target rotation amount by the target-rotation-amount calculation means when the vehicle speed detected by the vehicle speed detection means is less than a predetermined vehicle speed. In this case, since the determination as to whether to calculate the target rotation amount can be made in accordance with the vehicle speed, the optimal turning state of the vehicle which matches the circumstances can be obtained. This also enables the driver to drive the vehicle in accordance with his/her intention.

BEST MODE FOR CARRYING OUT THE INVENTION

Figure 1:
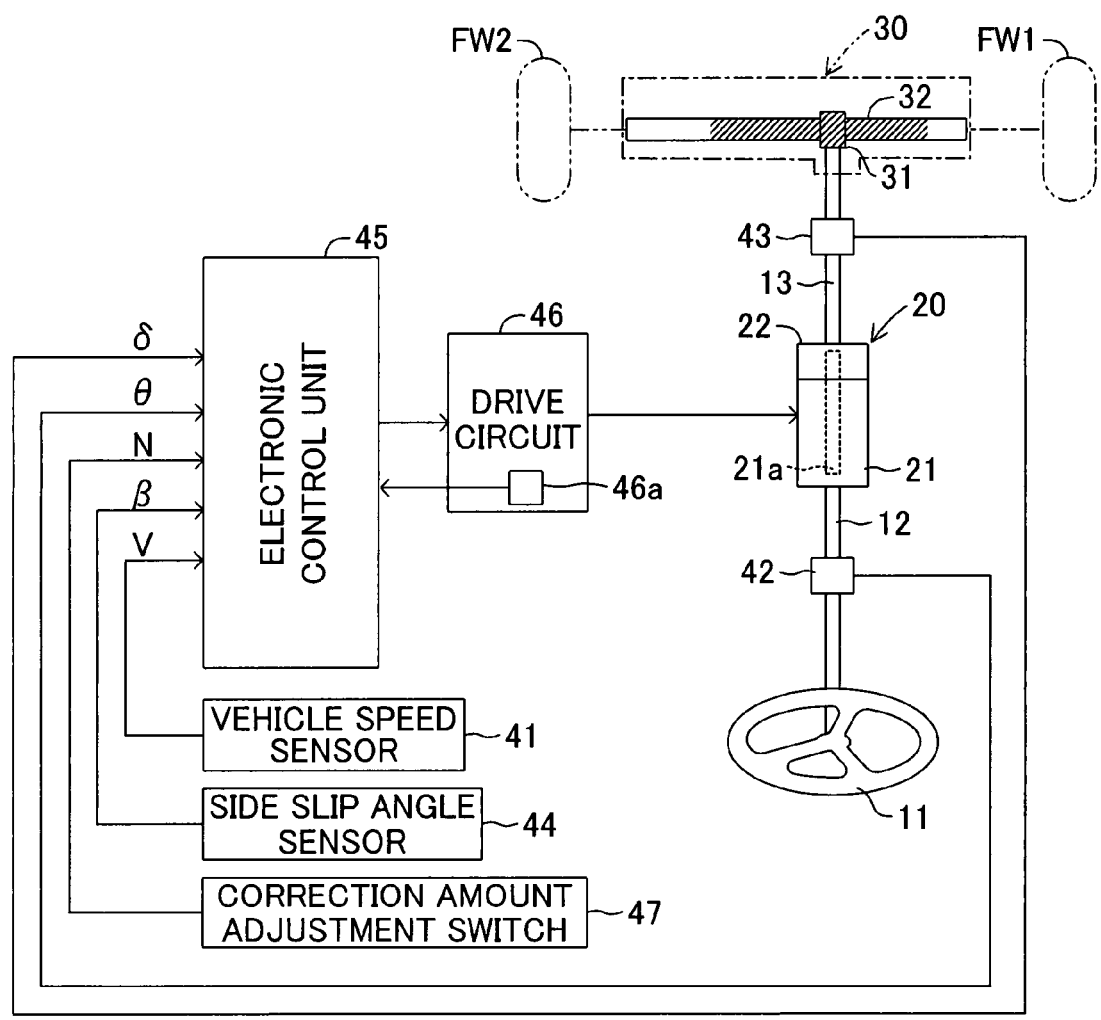
FIG. 1 is a schematic diagram of a steering apparatus for a vehicle according to an embodiment of the present invention.

Below, a steering apparatus for a vehicle according to an embodiment of the present invention will be described with reference to the drawings. FIG. 1 schematically shows the steering apparatus for a vehicle according to the embodiment.

This steering apparatus includes a steering wheel 11 which a driver rotates so as to steer left and right front wheels FW1 and FW2, which are steerable wheels. The steering wheel 11 is fixed to an upper end of a steering input shaft 12, and a lower end of the steering input shaft 12 is connected to a variable-gear-ratio actuator 20, which serves as an electric actuator. The variable-gear-ratio actuator 20 includes an electric motor 21 and a reducer 22. The variable-gear-ratio actuator 20 properly changes the amount of rotation of a steering output shaft 13 (i.e., steering angle δ) connected to the reducer 22, in relation to the amount of rotation of the steering input shaft 12 (i.e., steering angle θ).

The housing of the electric motor 21 is integrally connected to the steering input shaft 12, and rotates unitarily therewith when the steering wheel 11 is rotated by the driver. A drive shaft 21a of the electric motor 21 is connected to the reducer 22, so that rotational force of the electric motor 21 is transmitted to the reducer 22 via the drive shaft 21a. The reducer 22 is composed of a predetermined gear mechanism (e.g., a planetary gear mechanism or the like), and the steering output shaft 13 is connected to the gear mechanism. By virtue of this configuration, when the rotational force of the electric motor 21 is transmitted to the reducer 22 via the drive shaft 21a, the reducer 22 transmits the rotation of the drive shaft 21a to the steering output shaft 13 while properly reducing the rotational speed by means of the gear mechanism.

As described above, the variable-gear-ratio actuator 20 connects the steering input shaft 12 and the steering output shaft 13 via the drive shaft 21a of the electric motor 21 and the reducer 22 such that the steering input shaft 12 and the steering output shaft 13 can rotate relative to each other, and can properly change the ratio of the steering angle δ of the steering output shaft 13 to the steering angle θ of the steering input shaft 12; i.e., a transmission ratio K of rotation amount from the steering input shaft 12 to the steering output shaft 13. Accordingly, the steering angle δ of the steering output shaft 13 is represented in accordance with the following Eq. 1 by use of the steering angle θ of the steering input shaft 12.

$$\delta = K \cdot \theta \qquad \text{Eq. 1}$$

Moreover, the steering apparatus according to the present embodiment includes a steering gear unit 30 connected to the lower end of the steering output shaft 13. The steering gear unit 30 is, for example, a rack-and-pinion-type gear unit, and is designed such that rotation of a pinion gear 31 integrally mounted to the lower end of the steering output shaft 13 is transmitted to a rack bar 32. With this configuration, the rack bar 32 axially moves upon receipt of rotational force from the pinion gear 31. Accordingly, the left and right front wheels FW1 and FW2 connected to opposite ends of the rack bar 32 are steered to the steering angle δ.

Next, an electric controller for controlling operation of the above-described variable-gear-ratio actuator 20 (more specifically, drive of the electric motor 21) will be described. The electric controller includes a vehicle speed sensor 41, an input steering angle sensor 42, an output steering angle sensor 43, and a side slip angle sensor 44. The vehicle speed sensor 41 detects a speed of the vehicle, and outputs it as a vehicle speed V. The input steering angle sensor 42 detects a rotation amount of the steering wheel 11 from its neutral position (i.e., the rotation amount of the steering input shaft 12), and outputs it as the steering angle θ. The output steering angle sensor 43 detects a rotation amount of the steering output shaft 13 from its neutral position, and outputs it as the steering angle δ (corresponding to the steering angle of the left and right front wheels FW1 and FW2). Notably, each of the steering angle θ and the steering angle δ represents the neutral position by "0," represents a rotation amount in the counterclockwise direction by a positive value, and represents a rotation amount in the clockwise direction by a negative value.

The side slip angle sensor 44 detects a side slip angle β generated in the vehicle body of the vehicle in a turning state, and outputs it. When the side slip angle β is negative, it represents a leftward side slip angle with respect to the fore-aft direction of the vehicle, and when the side slip angle β is positive, it represents a rightward side slip angle with respect to the fore-aft direction of the vehicle. Although various methods can be employed to detect the side slip angle β of the vehicle body, preferably, the side slip angle β is detected as follows. That is, when a vehicle speed along the fore-aft direction of the vehicle is represented by Vx and a vehicle speed along the lateral direction of the vehicle is represented by Vy, the side slip angle β of the vehicle body can be calculated in accordance with the following Eq. 2.

$$\beta = \tan^{-1}(Vy/Vx) \qquad \text{Eq. 2}$$

Notably, the vehicle speeds Vx and Vy are preferably detected by use of detectors utilizing, for example, light or sound.

These sensors 41 to 44 are connected to an electronic control unit 45. The electronic control unit 45 includes, as a main component, a microcomputer composed of a CPU, ROM, RAM, etc., and controls operation of the electric motor 21 of the variable-gear-ratio actuator 20 through execution of a program. A drive circuit 46 for driving the electric motor 21 is connected to the output side of the electronic control unit 45. A current detector 46a for detecting drive current flowing through the electric motor 21 is provided in the drive circuit 46. The drive current detected by means of the current detector 46a is fed back to the electronic control unit 45 so as to control the drive of the electric motor 21.

Further, a correction amount adjustment switch 47 operated by a driver is connected to the electronic control unit 45. This correction amount adjustment switch 47 is used to adjust the magnitude of the value of a correction term (the degree of correction) used when the target steering angle δa of the steering output shaft 13 (that is, the left and right front wheels FW1 and FW2) is calculated through execution of a target-steering-angle calculation program to be described later. Therefore, the correction amount adjustment switch 47 is configured to enable a correction amount N, which represents the degree (extent) of correction, to be arbitrarily set between 0 and 5, for example. The correction amount adjustment switch 47 outputs to the electronic control unit 45 a signal representing the set correction amount N.

Figure 2:
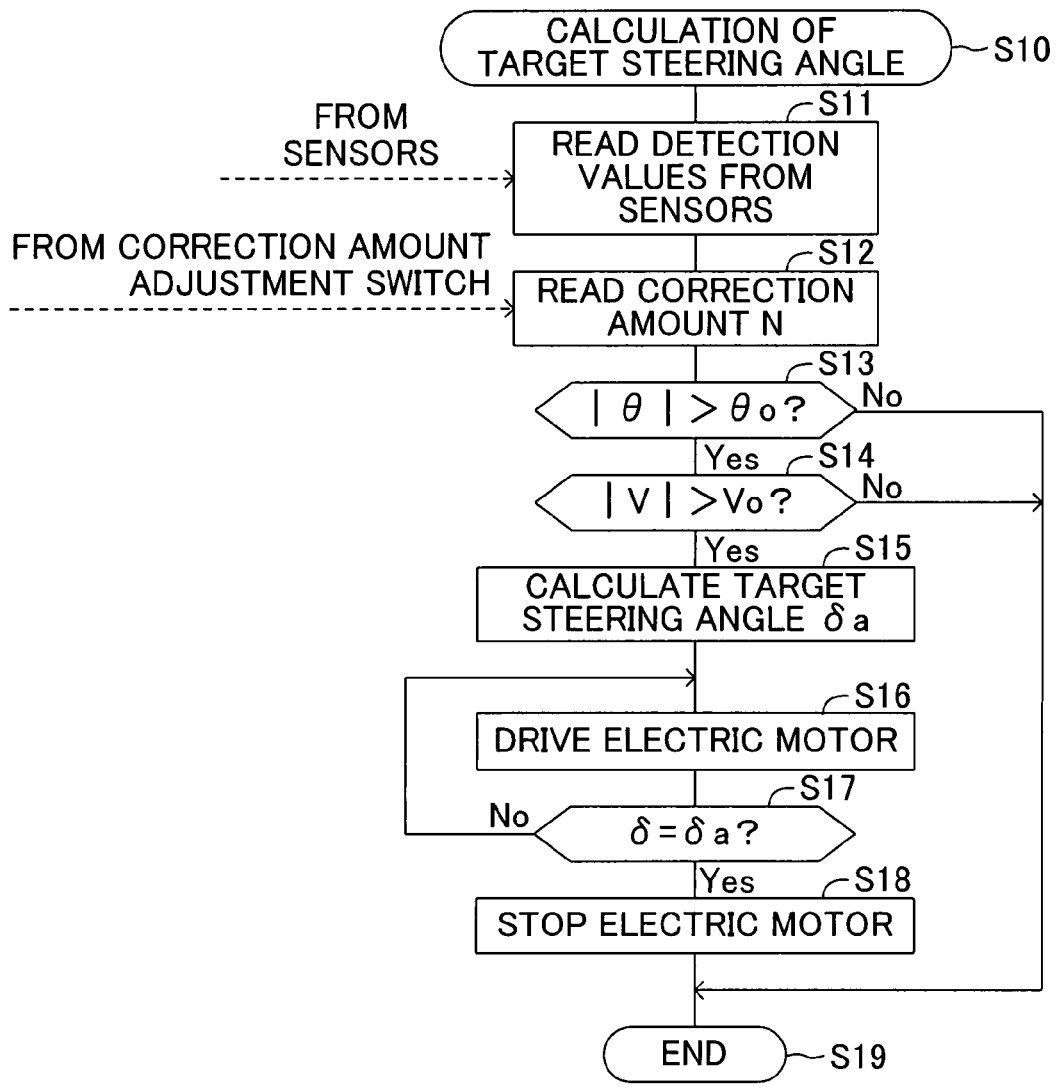
FIG. 2 is a flow chart showing a target-steered-angle calculation program executed by an electronic control unit of FIG. 1.

Next, operation of the embodiment configured as described above will be described in detail. When an unillustrated ignition switch is turned on by the driver, the electronic control unit 45 (more specifically, the CPU) repeatedly executes the target-steering-angle calculation program shown in FIG. 2 at predetermined short intervals.

That is, the electronic control unit 45 starts the target-steering-angle calculation program at step S10, and proceeds to step S11 so as to read the respective values detected by means of the vehicle speed sensor 41, the input steering angle sensor 42, and the side slip angle sensor 44; i.e., the vehicle speed V, the steering angle θ, and the side slip angle β. After receipt of the detection values from the sensors, in step S12, the electronic control unit 45 reads the signal representing the correction amount N set by the driver by making use of the correction amount adjustment switch 47, and then proceeds to step S13.

In step S13, the electronic control unit 45 determines whether the absolute value of the steering angle θ received from the input steering angle sensor 42 in step S11 is greater than a preset small positive steering angle θo. The steering angle θo is a predetermined angle for delimiting a rotation range of the steering wheel 11 in which straight travel of the vehicle can be maintained. Therefore, the determination processing in step S13 serves to determine whether the vehicle is in a turning state on the basis of the steering angle θ of the steering wheel 11 (the steering input shaft 12) input by the driver. That is, when the absolute value of the steering angle θ is greater than the positive steering angle θo, it means that the steering wheel 11 is positively rotated by the driver and the vehicle is in a turning state. Therefore, the electronic control unit 45 makes a "Yes" determination, and performs the processing in step S14 and that in subsequent steps.

Meanwhile, when the absolute value of the input steering angle θ is not greater than the positive steering angle θo, it means that the steering wheel 11 is held in the vicinity of the neutral position by the driver. When the steering wheel 11 is held in the vicinity of the neutral position as described above, the left and right front wheels FW1 and FW2 are not steered, and the vehicle is in a straight traveling state. Accordingly, the electronic control unit 45 makes a "No" determination, and proceeds to step S19 so as to end the current execution of the target-steering-angle calculation program. After elapse of the predetermined short time interval, the electronic control unit 45 again starts the execution of the target-steering-angle calculation program at step S10.

When the electronic control unit 45 makes a "Yes" determination in the above-described step S13, it proceeds to step S14 so as to determine whether the vehicle speed V received from the vehicle speed sensor 41 in the above-described step S11 is greater than a preset small vehicle speed Vo. The vehicle speed Vo is a predetermined speed for delimiting a vehicle speed range in which a large side slip angle β is not generated in the vehicle body even when the vehicle turns. The determination processing in step S14 serves to determine, on the basis of the currently detected vehicle speed V, whether the steering angle δ must be corrected in accordance with the side slip angle β generated in the vehicle body; i.e., whether the target steering angle δa to be described later must be calculated. When the vehicle speed V is higher than the predetermined vehicle speed Vo, the electronic control unit 45 must calculate the target steering angle δa in consideration of an influence of the side slip angle β of the vehicle body. Therefore, in such a case, the electronic control unit 45 makes a "Yes" determination, and proceeds to step S15. Meanwhile, when the vehicle speed V is not higher than the predetermined vehicle speed Vo, the electronic control unit 45 is not required to calculate the target steering angle δa. Therefore, in such a case, the electronic control unit 45 makes a "No" determination, and proceeds to step S19 so as to end the current execution of the target-steering-angle calculation program. After elapse of the predetermined short time interval, the electronic control unit 45 again starts the execution of the target-steering-angle calculation program at step S10.

Here, there will be described the influence of the side slip angle β of the vehicle body on the turning of the vehicle having the left and right front wheels FW1 and FW2 steered to a steering angle δc, for example. When the driver inputs a steering angle θc via the steering wheel 11, the left and right front wheels FW1 and FW2 of the vehicle are steered to the steering angle δc calculated in accordance with the above-described Eq. 1. As a result, the vehicle moves from a straight traveling state to a turning state, or maintains the turning state. When the vehicle is in a turning state, a centrifugal force generated as a result of turning, and a centripetal force toward the center of turning act on the vehicle. The centripetal force acting on the turning vehicle is provided by a lateral force toward the turning center produced between a road surface and the front and rear wheels of the vehicle (more specifically, tires attached to the front and rear wheels) (hereinafter, this lateral force will be referred to as "cornering force").

Specifically, the vehicle in a turning state travels along a predetermined turning circle determined on the basis of the steering angle δc of the left and right front wheels FW1 and FW2 (hereinafter, this traveling direction will be referred to as the "heading direction"), and is also apt to travel toward the direction of application of an inertial force. Therefore, the vehicle body in a turning state has a side slip angle β, which is represented by the angle difference between the heading direction and the direction of application of the inertial force. Incidentally, since the front and rear wheels are integrally mounted to the vehicle body, in a state in which the vehicle body has a side slip angle β, the tires of the front and rear wheels are apt to relatively displace in relation to the road surface in the direction of application of the inertial force. However, when the tires of the front and rear wheels relatively displace in relation to the road surface, friction forces are generated between the tires of the front and rear wheels and the road surface, so that the vehicle travels on the turning circle in the heading direction, rather than in the direction of application of the inertial force. In other words, a cornering force is generated based on the friction forces, and, because of the generated cornering force, a centripetal force which causes the vehicle to travel in the heading direction is generated.

Accordingly, the centripetal force of the vehicle whose left and right front wheels FW1 and FW2 (the steering output shaft 13) have been steered to the steering angle δc and which is in a turning state can be calculated in accordance with the following Eq. 3, which uses cornering forces generated at the front and rear wheels.

$$M \cdot \alpha = 2 \cdot Kf \cdot \delta c + 2 \cdot (Kf + Kr) \cdot \beta + \epsilon \qquad \text{Eq. 3}$$

M in Eq. 3 is the mass of the vehicle. α in Eq. 3 is an acceleration toward the turning center (hereinafter, this acceleration will be referred to as "centripetal acceleration"), and can be represented by the following Eq. 4

$$\alpha = V^2 \cdot (1/R) \qquad \text{Eq. 4}$$

R represents a turning radius of the vehicle determined on the basis of the steering angle δc; i.e., the steering angle θ input by the driver, and 1/R represents the curvature of the turning circle (the so-called turning curvature).

The relation shown in the following Eq. 5 holds between the steering angle δc and the turning curvature 1/R.

$$\delta c = L \cdot (1 + A \cdot V^2) \cdot (1/R) \qquad \text{Eq. 5}$$

L in Eq. 5 is a predetermined value representing the wheel base of the vehicle, and A is a predetermined value representing the stability of behavior of the vehicle. Through modification of Eq. 5, the turning curvature 1/R can be represented by the following Eq. 6.

$$1/R = \delta c / (L \cdot (1 + A \cdot V^2)) \qquad \text{Eq. 6}$$

Further, the following Eq. 7 is obtained by substituting the above-described Eq. 1 for Eq. 6.

$$1/R = (K/(L \cdot (1 + A \cdot V^2))) \cdot \theta c \qquad \text{Eq. 7}$$

Accordingly, the centripetal acceleration a can be represented by the following Eq. 8, which is obtained by substituting Eq. 7 for the above-described Eq. 4.

$$\alpha = (K \cdot V^2 / (L \cdot (1 + A \cdot V^2))) \cdot \theta c \qquad \text{Eq. 8}$$

Eq. 8 shows that the centripetal acceleration α is determined on the basis of the steering angle θc which the driver has input by rotating the steering wheel 11.

In the right side of the above-described Eq. 3, Kf is a coefficient representing a cornering force generated at the left and right front wheels FW1 and FW2, and Kr is a coefficient representing a cornering force generated at the rear wheels. Further, as described above, when the steering angle δ is positive; i.e., when the vehicle is turning leftward, a rightward side slip angle is generated, so that the side slip angle β of the vehicle body assumes a positive value, and when the steering angle δ is negative; i.e., when the vehicle is turning rightward, a leftward side slip angle is generated, so that the side slip angle β of the vehicle body assumes a negative value. Notably, on the right side of the above-described Eq. 3, ε is a very small force generated in association with a yaw rate generated when the vehicle turns, and therefore can be ignored. Accordingly, the centripetal force of the vehicle in a turning state can be represented by the following Eq. 9 in place of the above-described Eq. 3.

$$M \cdot \alpha = 2 \cdot Kf \cdot \delta c + 2 \cdot (Kf + Kr) \cdot \beta \qquad \text{Eq. 9}$$

According to Eq. 9, the centripetal force $M \cdot \alpha$ generated in the vehicle is calculated through summing a lateral force proportional to the steering angle $\delta c$ of the left and right front wheels FW1 and FW2 (hereinafter, this lateral force will be referred to as "steering lateral force") and a lateral force proportional to the side slip angle $\beta$ of the vehicle body (hereinafter, this lateral force will be referred to as "slip lateral force"). Incidentally, as is apparent from Eq. 9, the slip lateral force is naturally generated in a state in which the side slip angle $\beta$ is generated in the vehicle body, and is difficult for the driver to directly control via the steering wheel 11. As a result of the natural generation of the slip lateral force, a centripetal force which is greater than a centripetal force which the driver expects to be generated through rotation of the steering wheel 11.

As a result, the vehicle fails to turn with an expected turning radius which the driver has determined by rotating the steering wheel 11. Therefore, the driver must correct the steering angle $\delta c$ by properly rotating the steering wheel 11 such that the vehicle turns with the expected turning radius (hereinafter this steering operation will be referred to as "correction steering"). That is, the driver must operate the steering wheel 11 for correction such that the centripetal force $M \cdot \alpha$ decreases by an amount corresponding to a slip lateral force which will be naturally generated as a result of turning of the vehicle. As described above, the naturally generated side slip angle $\beta$ of the vehicle body affects the turning state of the vehicle whose left and right front wheels FW1 and FW2 have been steered to the steering angle $\delta c$.

Accordingly, in step S15, the electronic control unit 45 calculates the target steering angle $\delta a$, which causes the vehicle to turn with an expected turning radius which the driver has determined by rotating the steering wheel 11, while eliminating the influence of the slip lateral force naturally generated in the vehicle in a turning state (more specifically, the side slip angle $\beta$ of the vehicle body). Below, the calculation of the target steering angle $\delta a$ will be described in detail.

As described above, in a state in which the side slip angle $\beta$ of the vehicle body is generated as a result of the left and right front wheels FW1 and FW2 being steered to the steering angle $\delta c$, the centripetal force $M \cdot \alpha$ is calculated in accordance with the above-described Eq. 9; that is, by adding the slip lateral force to the steering lateral force. At this time, only the steering lateral force is required to turn the vehicle in accordance with rotation of the steering wheel 11, and the slip lateral force is unnecessary. Accordingly, in order to cause the vehicle to turn with an expected turning radius which the driver has determined by rotating the steering wheel 11, the steering lateral force is determined by use of the target steering angle $\delta a$ to satisfy the relation shown in the following Eq. 10, which is obtained by subtracting the slip lateral force from both sides of the above-described Eq. 9.

$$2 \cdot Kf \cdot \delta a = M \cdot \alpha - 2 \cdot (Kf + Kr) \cdot \beta \qquad \text{Eq. 10}$$

Thus, the target steering angle $\delta a$ can be calculated in accordance with the following Eq. 11, which is obtained by modifying Eq. 10.

$$\delta a = (M/(2 \cdot Kf)) \cdot \alpha - (1 + Kr/Kf) \cdot \beta \qquad \text{Eq. 11}$$

According to this Eq. 11, the target steering angle $\delta a$ is determined by subtracting the term proportional to the side slip angle $\beta$ of the vehicle body (i.e., a correction term) from the term proportional to the centripetal acceleration $\alpha$ (i.e., the term associated with the steering angle $\theta$ input by the driver as is apparent from the above-described Eq. 8). Therefore, in the case where the vehicle does not travel with an expected radius determined by the steering angle $\theta$ input by the driver, as described above, the driver performs a correction steering to the target steering angle $\delta a$ determined in accordance with Eq. 11.

In other words, when the target steering angle $\delta a$ is determined by subtracting the term proportional to the side slip angle $\beta$ of the vehicle body from the steering angle $\delta$ of the steering output shaft 13, which has the predetermined relation with the steering angle $\theta$ input by the driver, the influence of the slip lateral force; i.e., the side slip angle $\beta$ of the vehicle body, on the turning of the vehicle can be eliminated, whereby the vehicle can be caused to turn on the basis of only the centripetal acceleration $\alpha$; i.e., the steering angle $\theta$. With this operation, the vehicle can turn with an expected turning radius in accordance with rotation of the steering wheel 11, without requiring the driver to perform correction steering.

Here, as shown in the following Eq. 12, the correction amount N input by making use of the correction amount adjustment switch 48 is set to correspond to (1+Kr/Kf) by which the side slip angle $\beta$ of the vehicle body is multiplied in the above-described Eq. 11, and the above-described Eq. 11 is modified by use of the above-described Eq. 1. Thus, the target steering angle $\delta a$ can be represented by the following Eq. 13.

$$N = 1 + Kr/Kf \qquad \text{Eq. 12}$$

$$\delta a = K1 \cdot \theta - N \cdot \beta \qquad \text{Eq. 13}$$

Notably, the correction amount N in Eq. 13 is initially set to 2 in accordance with Eq. 12 for a state in which the cornering force Kf and the cornering force Kr are equal to each other. Further, K1 in Eq. 13 is a transmission ratio which is properly changed by means of the reducer 22 of the variable-gear-ratio actuator 20 and which can be represented by the following Eq. 14.

$$K1 = (M/(2 \cdot Kf)) \cdot (K \cdot V^2 / (L \cdot (1 + A \cdot V^2))) \qquad \text{Eq. 14}$$

The electronic control unit 45 calculates the target steering angle $\delta a$ by use of the steering angle $\theta$ and the side slip angle $\beta$ read in the above-described step S11 and the correction amount N read in the above-described step S12, and in accordance with the above-described Eq. 13.

After having calculated the target steering angle $\delta a$ in the above-described step S15, the electronic control unit 45 repeatedly performs steps S16 and S17 so as to drive the electric motor 21, without any overshoot, until the steering output shaft 13 (that is, the left and right front wheels FW1 and FW2) reaches the target steering angle $\delta a$. Specifically, in step S16, the electronic control unit 45 reads the signal from the current detector 46a of the drive circuit 46 and indicating the drive current flowing through the electric motor 21 of the variable-gear-ratio actuator 20, and performs feedback control such that a proper drive current flow through the electric motor 21. As a result, the electric motor 21 rotates the steering output shaft 13. Subsequently, in step S17, the electronic control unit 45 repeatedly makes a "No" determination until the steering angle $\delta$ of the steering output shaft 13 received from the output steering angle sensor 43 coincides with the target steering angle $\delta a$. When the steering angle $\delta$ coincides with the target steering angle $\delta a$, the electronic control unit 45 makes a "Yes" determination, and proceeds to step S18.

In step S18, the electronic control unit 45 stops the drive of the electric motor 21, and in step Si 9, ends the current execution of the program. After elapse of the predetermined short time interval, the electronic control unit 45 again starts the execution of the target-steering-angle calculation program.

As can be understood from the above description, according to the present embodiment, the electronic control unit 45 can calculate the target steering angle δa of the steering output shaft 13 in accordance with the above-described Eq. 13 and in consideration of the correction term determined in accordance with the side slip angle β of the vehicle body detected by the side slip angle sensor 44. That is, the electronic control unit 45 can calculate the target steering angle δa by subtracting the correction term (N·β) from the steering angle δ (=K1·θ) of the steering output shaft 13 calculated in accordance with the above-described Eq. 1.

By virtue of the above calculation, the influence of a lateral force which the driver does not expect and which acts on the vehicle in a turning state can be reduced. As a result, when the driver rotates the steering wheel 11, in appearance, only a lateral force based on the rotation; i.e., a steering lateral force, acts on the vehicle. Thus, the vehicle can be turned in accordance with the operation of the steering wheel 11. In other words, the vehicle can be turned by an amount corresponding to the rotation of the steering wheel 11. Accordingly, even when a driver who is not very knowledgeable drives a vehicle at high speed, or on snow or ice, the behavior of the vehicle during turning can be stabilized, and the driver can drive the vehicle in accordance with his/her intention.

Since the correction term can be calculated by multiplying the side slip angle β of the vehicle body by the correction amount N input by the driver, the degree of correction can be determined in accordance with the driver's preference. As a result, the behavior of the vehicle during turning can be stabilized, and driving of the vehicle in accordance with his/her intention is enabled, while good steering feeling is secured.

Moreover, since the determination as to whether to calculate the target steering angle δa is performed on the basis of the detected vehicle speed V, the optimal turning state of the vehicle which matches the circumstances can be obtained. This also enables the driver to drive the vehicle in accordance with his/her intention.

Although the embodiment of the present invention has been described above, the present invention is not limited to the embodiment, and may be practiced with various modifications without departing from the scope of the present invention.

For example, in the above-described embodiment, the present invention is embodied in a steering apparatus in which the steering input shaft 12 and the steering output shaft 13 are connected together via the variable-gear-ratio actuator 20, and the steering input shaft 12 and the steering output shaft 13 can be rotated relative to each other. However, the present invention may be embodied by applying the above-described target-steering-angle calculation program to other types of steering apparatuses in which the steering input shaft 12 and the steering output shaft 13 can be rotated relative to each other; e.g., a steering-by-wire-type steering apparatus. This modification will be described below. Notably, the same portions as the above-described embodiment are denoted by the same reference numerals, and their detailed descriptions are not repeated.

Figure 3:
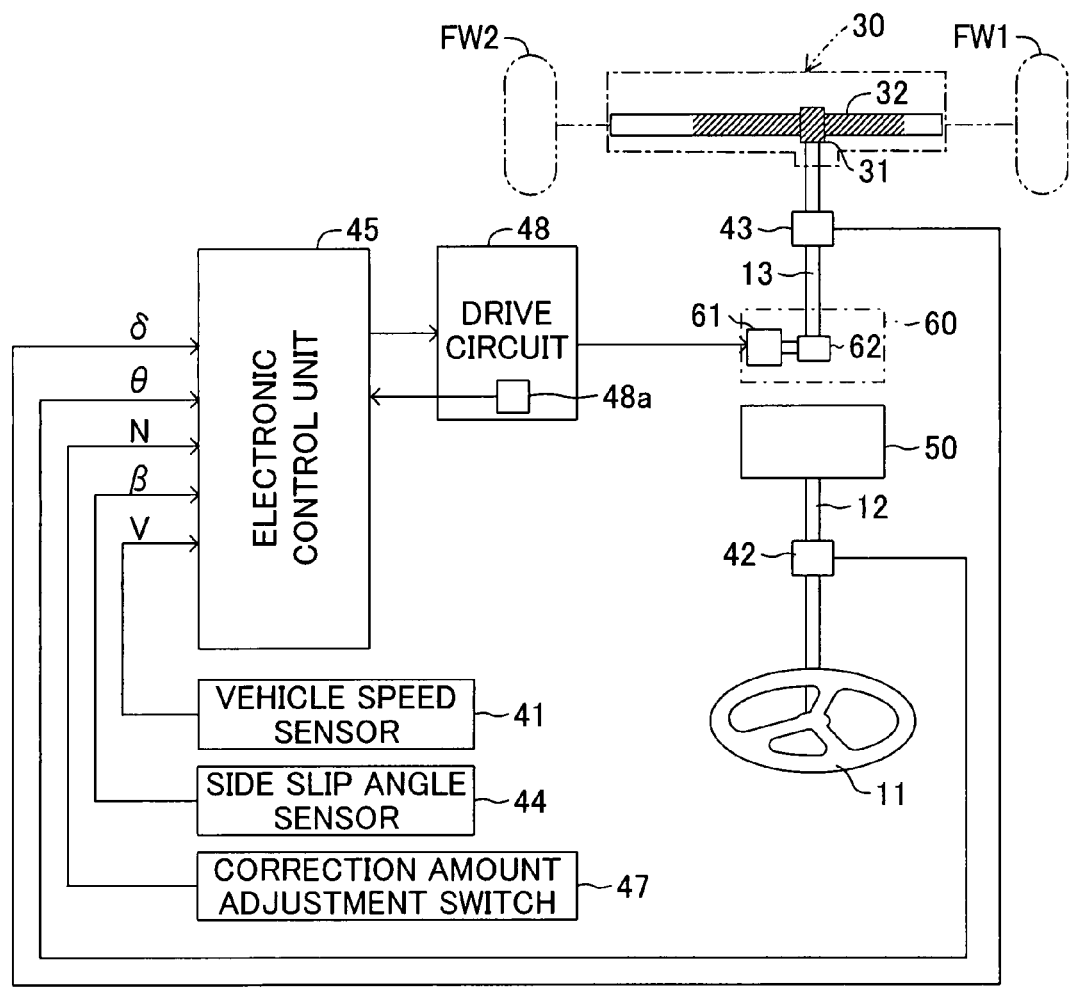
FIG. 3 is a schematic diagram of a steering apparatus for a vehicle according to a modified embodiment of the present invention.

As shown in FIG. 3, a steering apparatus for a vehicle according to the present modification employs a steering-by-wire system in which the mechanical connection between the steering input shaft 12 and the steering output shaft 13 is eliminated. Therefore, a reaction actuator 50 composed of an electric motor and a reduction mechanism is connected to the lower end of the steering input shaft 12. This reaction actuator 50 provides a reaction force against the rotation of the steering wheel 11 by the driver. Meanwhile, a steering actuator 60, which serves as an electric actuator, is attached to the upper end of the steering output shaft 13. This steering actuator 60 includes an electric motor 61 and a reduction mechanism 62, and rotates the steering output shaft 13. Rotation of the steering output shaft 13 is transmitted to the steering gear unit 30 as in the above-described embodiment. With this configuration, the rack bar 32 axially moves upon receipt of rotational force from the pinion gear 31, whereby the left and right front wheels FW1 and FW2 are steered leftward or rightward.

In the case of the steering apparatus for a vehicle according to the present modification, a drive circuit 48 for driving the electric motor 61 of the steering actuator 60 is connected to the output side of the electronic control unit 45. A current detector 48a for detecting drive current flowing through the electric motor 61 is provided in the drive circuit 48. The drive current detected by means of the current detector 48a is fed back to the electronic control unit 45.

The steering apparatus for a vehicle according to the present modification configured as described above also enables the rotation amount of the steering output shaft 13 (steering angle δ) to be changed in relation to the rotation amount of the steering input shaft 12 (steering angle θ). More specifically, when the driver rotates the steering wheel 11, the rotation amount of the steering input shaft 12; i.e., the steering angle θ, is detected by means of the input steering angle sensor 42. Upon receipt of the detected steering angle θ, the electronic control unit 45 properly sets the ratio of the steering angle δ of the steering output shaft 13 to the steering angle θ of the steering input shaft 12; i.e., the transmission ratio K, and calculates the steering angle δ of the steering output shaft 13 in accordance with the above-described Eq. 1 as in the above-described embodiment. The electronic control unit 45 then drives the electric motor 61 of the steering actuator 60 until the angle of the steering output shaft 13 detected by means of the output steering angle sensor 43 reaches the steering angle δ.

With this operation, as in the above-described embodiment, the left and right front wheels FW1 and FW2 can be steered to the steering angle δ, which has the predetermined relation with the steering angle θ input by the driver via the steering wheel 11. Therefore, in this modification as well, effects similar to those attained in the above-described embodiment are expected to be attained through execution of the above-described target-steering-angle calculation program.

In the above-described embodiment, the side slip angle sensor 44 calculates the side slip angle β of the vehicle body in accordance with the above-described Eq. 2, which uses the vehicle speeds Vx and Vy detected by means of detectors. Alternatively, in the case where an acceleration sensor for detecting a lateral acceleration α generated in the vehicle (corresponding to the centripetal acceleration α) and a yaw rate sensor for detecting a yaw rate ω are previously installed in the vehicle, the side slip angle β of the vehicle body can be obtained by making use of detection values of these sensors. In this case, preferably, the side slip angle β of the vehicle body is calculated and detected in accordance with the following Eq. 15.

$$\beta = \int (\omega - \alpha/V) dt \qquad \text{Eq. 15}$$

Notably, V in Eq. 15 represents the vehicle speed V detected by means of the vehicle speed sensor 41.

In this case, a detector is not required to be provided separately as in the above-described embodiment, although the present modification is slightly inferior to the above-described embodiment in terms of the detection accuracy of the side slip angle β of the vehicle body, because of a time delay before generation of the lateral acceleration α and the yaw rate γ. Therefore, the manufacturing cost of the steering apparatus can be lowered.

In the above-described embodiment, in step S14 of the target-steering-angle calculation program, the determination as to whether to calculate the target steering angle δa is performed in accordance with the detected vehicle speed V. However, the step S14 may be omitted. In this case, the present invention can be embodied in the same manner as in the above-described embodiment except that the target steering angle δa is calculated over the entirety of the vehicle speed range. Accordingly, in this case as well, effects similar to those attained in the above-described embodiment can be attained.

In the above-described embodiment, in accordance with the above-described Eq. 13, the target steering angle δa is calculated by subtracting N·β (correction term) from the steering angle δ (=K1·θ) of the steering output shaft 13. However, since the transmission ratio K can be changed freely by means of the variable-gear-ratio actuator 20, which serves as an electric actuator, a transmission ratio K2, which is smaller than the transmission ratio K, may be determined from the transmission ratio K in the above-described Eq. 1 in consideration of the correction term (N·β). In this case, since the transmission K2 is determined in consideration of the correction term (N·β), a steering angle δ calculated by the above-described Eq. 1 with the transmission coefficient K thereof replaced with the transmission coefficient K2 becomes equal to the target steering angle δa of the above-described embodiment. Accordingly, effects similar to those attained in the above-described embodiment are expected.

In the above-described embodiment, the correction term is calculated by multiplying the side slip angle β of the vehicle body by the correction amount N which the driver arbitrary enters by use of the correction amount adjustment switch 47. However, needless to say, the present invention can be embodied to calculate the target steering angle δa while automatically obtaining the value of the correction term by means of multiplying the side slip angle β of the vehicle body by the coefficient (1+Kr/Kf), which uses the cornering forces of the front and rear wheels. In this case, the optimal correction term can be automatically determined in accordance with the turning state of the vehicle, whereby the vehicle can be quite easily caused to turn in a stable state.

In the above-described embodiment, the steering gear unit 30 is of a rack-and-pinion type. However, for example, a ball-screw mechanism may be employed. Although the variable-gear-ratio actuator 20 is composed of the electric motor 21 and the reducer 22, a stepping motor may be employed as the electric motor 21 so as to eliminate the reducer 22.

The invention claimed is:

1. A steering apparatus for a vehicle which includes a steering input shaft integrally connected to a steering wheel rotated by a driver, a steering output shaft connected to a steering mechanism for steering steerable wheels, and an electric actuator for changing the amount of rotation of the steering output shaft with respect to the amount of rotation of the steering input shaft, the steering apparatus comprising:

side-slip-angle detection means for detecting a side slip angle of a vehicle body generated when the vehicle is in a turning state;

target-rotation-amount calculation means for calculating a target rotation amount of the steering output shaft based on a correction term determined in accordance with the side slip angle of the vehicle body detected by the side-slip-angle detection means so as to reduce an influence, on the turning state of the vehicle, of a lateral force generated in the vehicle due to the side slip angle of the vehicle body;

adjustment value input means which is operated to enter an adjustment value representing a degree to which the influence of the lateral force on the turning state of the vehicle is reduced; and drive control means for controlling drive of the electric actuator on the basis of the target rotation amount calculated by the target-rotation-amount calculation means, wherein the correction term is calculated by multiplying together the adjustment value from the adjustment value input means and the detected side slip angle of the vehicle body.

2. A steering apparatus for a vehicle according to claim 1, wherein the target-rotation-amount calculation means calculates the target rotation amount by subtracting the correction term from the rotation amount of the steering output shaft, which has a predetermined relation with the rotation amount of the steering input shaft.

3. A steering apparatus for a vehicle according to claim 1, wherein the adjustment value is based on a coefficient calculated by use of a cornering force toward a turning center of the vehicle on the basis of a friction force between a road surface and front and rear wheels of the vehicle in a turning state.

4. A steering apparatus for a vehicle according to claim 1, further comprising:

vehicle speed detection means for detecting a speed of the vehicle; and prohibition means for prohibiting calculation of the target rotation amount by the target-rotation-amount calculation means when the vehicle speed detected by the vehicle speed detection means is less than a predetermined vehicle speed.

5. A steering apparatus for a vehicle according to claim 1, wherein the side-slip-angle detection means detects the side slip angle of the vehicle body by making use of a vehicle speed in the fore-aft direction of the vehicle and a vehicle speed in the lateral direction of the vehicle detected by use of light or sound.

6. A steering apparatus for a vehicle according to claim 1, wherein the side-slip-angle detection means includes:

a yaw-rate sensor for detecting a yaw rate of the vehicle;

an acceleration sensor for detecting a lateral acceleration of the vehicle;

a vehicle speed sensor for detecting a speed of the vehicle; and side-slip-angle calculation means for calculating the side slip angle of the vehicle body by use making use of the detected yaw rate, lateral acceleration, and vehicle speed.

7. A steering apparatus for a vehicle according to claim 2, wherein the predetermined relation is a relation representing a transmission ratio at which rotation of the steering input shaft is transmitted to the steering output shaft.

8. A steering apparatus for a vehicle according to claim 2, wherein the adjustment value is based on a coefficient calculated by use of a cornering force toward a turning center of the vehicle on the basis of a friction force between a road surface and front and rear wheels of the vehicle in a turning state.

9. A steering apparatus for a vehicle according to claim 2, further comprising:

vehicle speed detection means for detecting a speed of the vehicle; and prohibition means for prohibiting calculation of the target rotation amount by the target-rotation-amount calculation means when the vehicle speed detected by the vehicle speed detection means is less than a predetermined vehicle speed.

10. A steering apparatus for a vehicle which includes a steering input shaft integrally connected to a steering wheel rotated by a driver, a steering output shaft connected to a steering mechanism for steering steerable wheels, and an electric actuator for changing the amount of rotation of the steering output shaft with respect to the amount of rotation of the steering input shaft, the steering apparatus comprising:

a side-slip-angle sensor that detects a side slip angle of a vehicle body generated when the vehicle is in a turning state;

an electronic control unit that calculates a target rotation amount of the steering output shaft based on a correction term determined in accordance with the side slip angle of the vehicle body detected by the side-slip-angle detection sensor so as to reduce an influence, on the turning state of the vehicle, of a lateral force generated in the vehicle due to the side slip angle of the vehicle body;

a correction amount adjustment switch that enters an adjustment value representing a degree to which the influence of the lateral force on the turning state of the vehicle is reduced; and a drive circuit that controls a drive of the electric actuator on the basis of the target rotation amount calculated by the electronic control unit, wherein the correction term is calculated by multiplying together the adjustment value from the correction amount adjustment switch and the detected side slip angle of the vehicle body.

11. A steering apparatus for a vehicle according to claim 10, wherein the electronic control unit calculates the target rotation amount by subtracting the correction term from the rotation amount of the steering output shaft, which has a predetermined relation with the rotation amount of the steering input shaft.

12. A steering apparatus for a vehicle according to claim 10, further comprising:

a vehicle speed sensor that detects a speed of the vehicle, wherein the electronic control unit calculates the target rotation amount when the vehicle speed detected by the vehicle speed detection sensor is greater than a predetermined vehicle speed.

* * * * *

UNITED STATES PATENT AND TRADEMARK OFFICE
CERTIFICATE OF CORRECTION

| | | |
|---|---|---|
| PATENT NO. | : 7,957,867 B2 | Page 1 of 1 |
| APPLICATION NO. | : 11/661496 | |
| DATED | : June 7, 2011 | |
| INVENTOR(S) | : Takeshi Goto et al. | |

It is certified that error appears in the above-identified patent and that said Letters Patent is hereby corrected as shown below:

On the title page, Item (86), the PCT No. is incorrect. Item (86) should read:

-- (86)  PCT No.:    PCT/JP2006/311148

§371 (c)(1),
       (2), (4) Date:    Feb. 27, 2007 --

Signed and Sealed this
Sixteenth Day of August, 2011

David J. Kappos
*Director of the United States Patent and Trademark Office*